United States Patent
Inoue et al.

(10) Patent No.: US 9,902,618 B2
(45) Date of Patent: Feb. 27, 2018

(54) CARBON NANOTUBE SHEET AND PRODUCTION METHOD FOR CARBON NANOTUBE SHEET

(71) Applicants: Tetsuya Inoue, Osaka (JP); Satoshi Imasaka, Osaka (JP)

(72) Inventors: Tetsuya Inoue, Osaka (JP); Satoshi Imasaka, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 170 days.

(21) Appl. No.: 14/895,061

(22) PCT Filed: May 30, 2014

(86) PCT No.: PCT/JP2014/064358
§ 371 (c)(1),
(2) Date: Dec. 1, 2015

(87) PCT Pub. No.: WO2014/196459
PCT Pub. Date: Dec. 11, 2014

(65) Prior Publication Data
US 2016/0145105 A1 May 26, 2016

(30) Foreign Application Priority Data
Jun. 5, 2013 (JP) .................... 2013-118393

(51) Int. Cl.
C01B 31/02 (2006.01)
B32B 9/00 (2006.01)
C01B 32/168 (2017.01)

(52) U.S. Cl.
CPC .......... *C01B 31/0253* (2013.01); *B32B 9/007* (2013.01); *C01B 32/168* (2017.08); *C01P 2004/03* (2013.01); *C01P 2004/13* (2013.01)

(58) Field of Classification Search
CPC ................................. C01B 31/0253
(Continued)

(56) References Cited

U.S. PATENT DOCUMENTS

2009/0068461 A1    3/2009  Reneker et al.
2009/0159198 A1*   6/2009  Wang ............... B32B 27/08
                                                    156/281

(Continued)

FOREIGN PATENT DOCUMENTS

| CN | 101480858 | 7/2009 |
| CN | 101880036 | 11/2010 |

(Continued)

OTHER PUBLICATIONS

Chinese Office Action in corresponding Chinese Patent Application No. 201480022076.2, dated Jan. 10, 2017.
(Continued)

*Primary Examiner* — Brent T O'Hern
(74) *Attorney, Agent, or Firm* — Fildes & Outland, P.C.

(57) ABSTRACT

A carbon nanotube sheet includes a carbon nanotube layer containing numerous vertically aligned carbon nanotubes and a fibrous carbonized layer that retains the proximal end portions of the carbon nanotubes. The carbon nanotube layer is configured such that the proximal end portions and distal end portions of the carbon nanotubes are inclined and the intermediate portions of the carbon nanotubes are entangled with one another.

10 Claims, 8 Drawing Sheets

(58) Field of Classification Search
USPC .......................................................... 428/119
See application file for complete search history.

(56) References Cited

U.S. PATENT DOCUMENTS

| | | |
|---|---|---|
| 2009/0181239 A1 | 7/2009 | Fan et al. |
| 2010/0173228 A1 | 7/2010 | Wallace et al. |
| 2011/0143087 A1 | 6/2011 | Alberding et al. |
| 2011/0318568 A1 | 12/2011 | Liu et al. |
| 2012/0237680 A1 | 9/2012 | Brahim et al. |

FOREIGN PATENT DOCUMENTS

| | | |
|---|---|---|
| JP | 2006-247758 | 9/2006 |
| JP | 2007-035811 | 2/2007 |
| JP | 2007-515364 | 6/2007 |
| JP | 2009-149517 | 7/2009 |
| JP | 2010-512298 | 4/2010 |
| JP | 2012-166988 | 9/2012 |
| JP | 2013-510789 | 3/2013 |
| WO | 2014/087735 | 6/2014 |

OTHER PUBLICATIONS

Extended European Search Report in corresponding European Patent Application No. 14808111.0, dated Dec. 20, 2016.
International Search Report in corresponding PCT application PCT/JP2014/064358.
English language machine translation of JP 2009-149517.
English language machine translation of JP 2006-247758.
English language machine translation of JP 2007-035811.
English language machine translation of JP 2012-166988.

* cited by examiner

F I G. 4
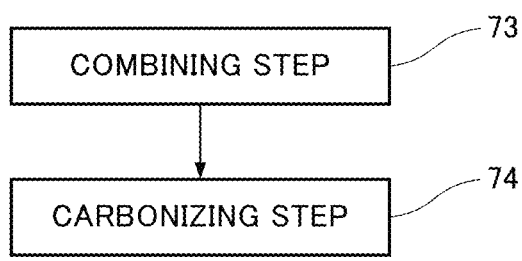

F I G. 8
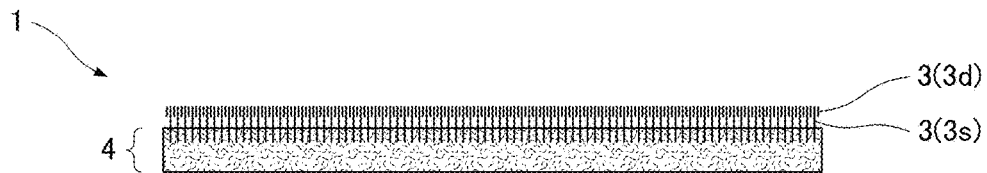
F I G. 9
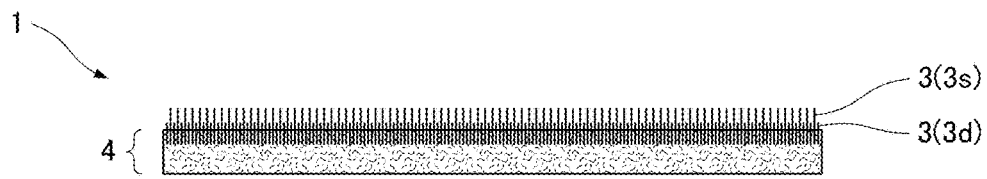
F I G. 10
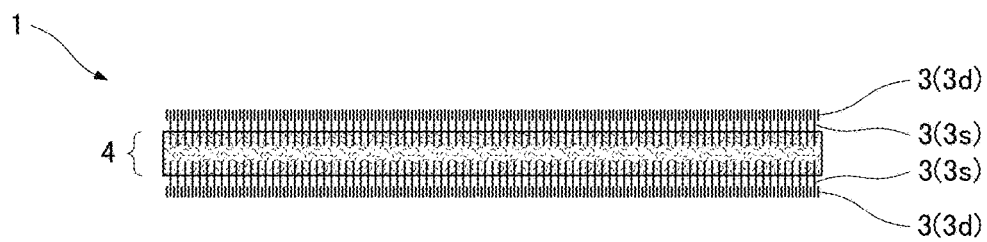
F I G. 11
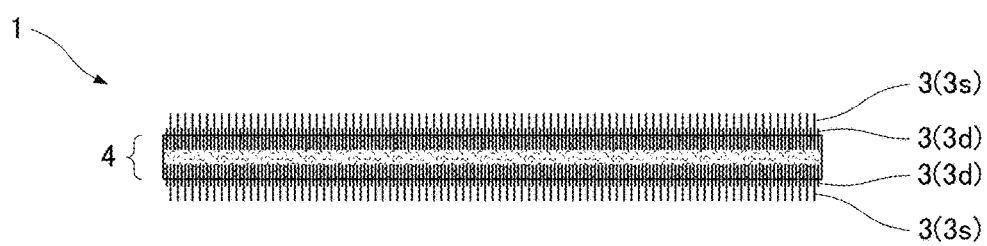

CARBON NANOTUBE SHEET AND PRODUCTION METHOD FOR CARBON NANOTUBE SHEET

TECHNICAL FIELD

The present invention relates to a carbon nanotube sheet and a production method for the carbon nanotube sheet.

BACKGROUND ART

Carbon nanotube materials have various characteristics and are expected to be applied to various fields. Individual vertically aligned carbon nanotubes, that is, vertically aligned carbon nanotubes particularly have large surface areas and thus the characteristics of the carbon nanotubes are demonstrated in wide application areas.

Generally, such vertically aligned carbon nanotubes are formed on a substrate surface in the production process. In a proposed method, vertically aligned carbon nanotubes are peeled from a substrate surface using water and the temperature of water (for example, see Patent Literature 1).

CITATION LIST

Patent Literature

Patent Literature 1: Japanese Patent Laid-Open No. 2009-149517

SUMMARY OF INVENTION

Technical Problem

In the method of Patent Literature 1, however, carbon nanotubes are not retained at all after being peeled from a substrate, leading to a weak force for keeping the sheet form of the carbon nanotubes. If carbon nanotubes are peeled with a wide area from the substrate, unfortunately, the sheet form of the carbon nanotubes is easily deformed during peeling.

Moreover, in the method of Patent Literature 1, the carbon nanotubes can be peeled from the substrate while keeping shape characteristics obtained on the substrate. However, high-function carbon nanotubes have been demanded in recent years and the characteristics of carbon nanotubes are not improved by peeling.

An object of the present invention is to provide a carbon nanotube sheet and a production method for the carbon nanotube sheet which can improve the characteristics of carbon nanotubes while keeping a sheet form over a large area.

Solution to Problems

In order to solve the problems, a carbon nanotube sheet according to a first aspect of the present invention includes a carbon nanotube layer that contains numerous vertically aligned carbon nanotubes and a fibrous carbonized layer that retains the proximal end portions of the carbon nanotubes, the carbon nanotube layer being configured such that the proximal end portions and distal end portions of the carbon nanotubes are inclined and the intermediate portions of the carbon nanotubes are entangled with one another.

In order to solve the problems, a production method for a carbon nanotube sheet according to a second aspect of the present invention includes: a combining step of forming a composite sheet by thermally pressing a thermally carbonized sheet to carbon nanotubes; and a carbonizing step of carbonizing the thermally carbonized sheet in the composite sheet by heating the composite sheet in an atmosphere of inert gas, the thermally carbonized sheet being heated into a fibrous form.

In a production method for a carbon nanotube sheet according to a third aspect of the present invention, bending of the composite sheet in the carbonizing step of the production method according to the second aspect is restricted by a stiffening member.

In a production method for a carbon nanotube sheet according to a fourth aspect of the present invention, the carbon nanotubes in the combining step of the production method according to one of the second and third aspects are two layers of vertically aligned carbon nanotubes that are stacked by pressing the layers together.

In a production method for a carbon nanotube sheet according to a fifth aspect of the present invention, in the two layers of the vertically aligned carbon nanotubes in the production method according to the fourth aspect, the carbon nanotubes making up the respective layers vary in length and/or density.

In a production method for a carbon nanotube sheet according to a sixth aspect of the present invention, the pressing of the thermally carbonized sheet to the carbon nanotubes in the combining step of the production method according to any one of the second to fifth aspects is to hold the thermally carbonized sheet with the vertically aligned carbon nanotubes from the front and back sides of the sheet.

In a production method for a carbon nanotube sheet according to a seventh aspect of the present invention, the thermally carbonized sheet of the production method according to any one of the second to sixth aspects is delivered from a location for the combining step to a location for the carbonizing step and is delivered in batches or continuously.

Advantageous Effect of Invention

The carbon nanotube sheet and the production method for the carbon nanotube sheet can keep a sheet form even with a large area, thereby improving the characteristics of carbon nanotubes.

BRIEF DESCRIPTION OF DRAWINGS

FIG. 4 is a schematic process diagram showing a production method for the carbon nanotube sheet.

FIG. 8 is an enlarged cross-sectional view showing a configuration of a carbon nanotube sheet according to a third embodiment of the present invention.

FIG. 9 is an enlarged cross-sectional view showing another configuration of the carbon nanotube sheet.

FIG. 10 is an enlarged cross-sectional view showing a configuration of a carbon nanotube sheet according to a fourth embodiment of the present invention.

FIG. 11 is an enlarged cross-sectional view showing another configuration of the carbon nanotube sheet.

DESCRIPTION OF EMBODIMENTS

First Embodiment

A carbon nanotube sheet and a production method for the carbon nanotube sheet according to a first embodiment of the present invention will be described below with reference to the accompanying drawings.

The carbon nanotube sheet will be first described below.

Figure 1A:
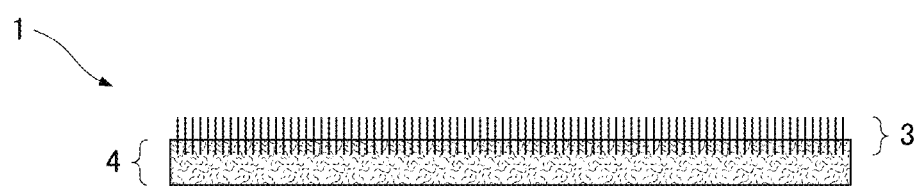
FIGS. 1A and 1B are enlarged cross-sectional views of a carbon nanotube sheet according to a first embodiment of the present invention, FIG. 1A showing a brush-like carbon nanotube layer, FIG. 1B showing a carbon nanotube layer in an entangled state.
Figure 1B:
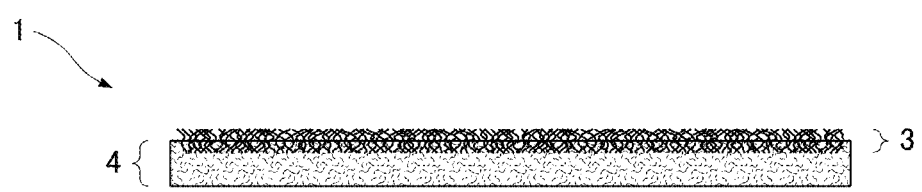

As shown in FIG. 1, a carbon nanotube sheet 1 includes a carbon nanotube layer 3 that contains numerous vertically aligned carbon nanotubes and a fibrous carbonized layer 4 that retains the proximal end portions of the carbon nanotubes to keep the layer shape of the carbon nanotube layer 3. Specifically, the proximal end portions of the carbon nanotubes are not deformed by the fibrous carbonized layer 4, keeping the brush-like form of the carbon nanotube layer 3 shown in FIG. 1A from coming apart. As a matter of course, if the carbon nanotube layer 3 is placed in an entangled state as shown in FIG. 1B, the carbon nanotubes are bonded with one another with a van der Waals force, thereby further keeping them from coming apart. In this case, the entangled state means that the distal and proximal end portions of carbon nanotubes are inclined with entangled intermediate portions.

Figure 2A:
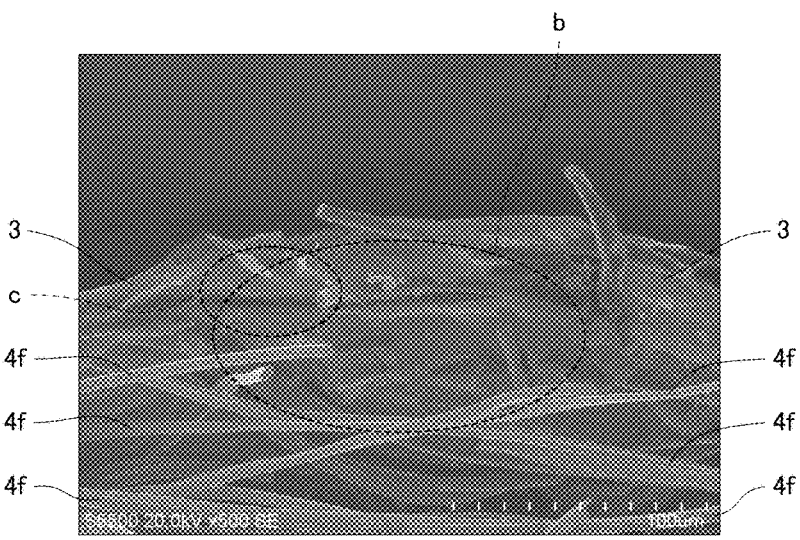
FIGS. 2A to 2C are enlarged SEM photographs of the carbon nanotube sheet, FIG. 2A showing a cross section with a 500-fold magnification, FIG. 2B showing a cross section with a 2000-fold magnification, FIG. 2C showing a cross section with a 5000-fold magnification.
Figure 2B:
Figure 2C:
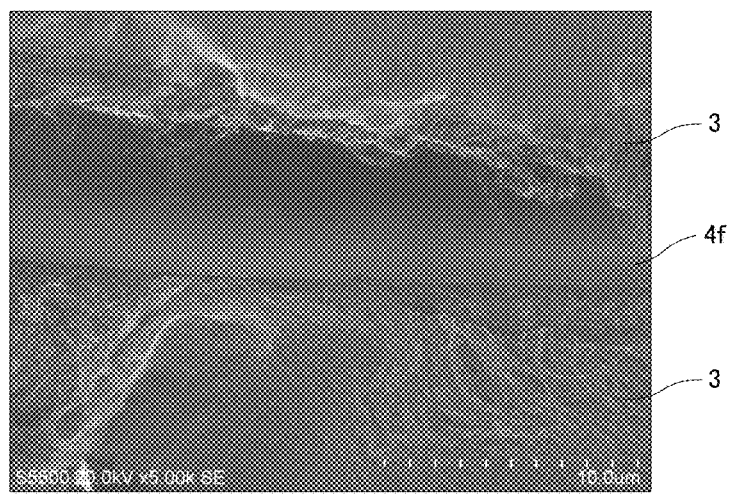
Figure 3A:
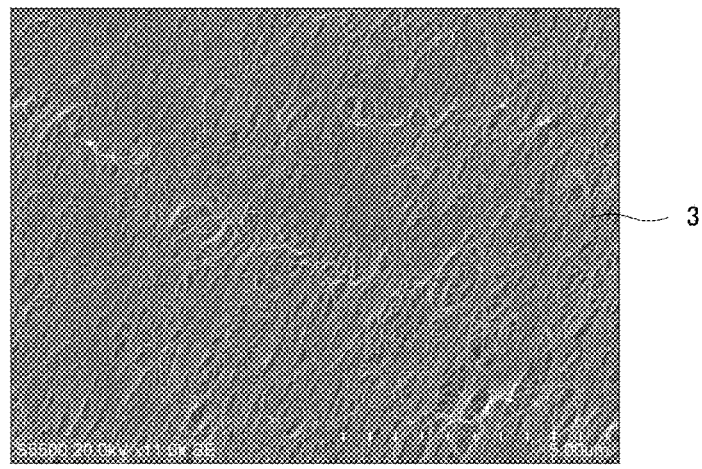
FIGS. 3A to 3C are enlarged SEM photographs of the carbon nanotube layer in an entangled state, FIG. 3A showing a surface with a 11000-fold magnification, FIG. 3B showing the surface with a 10000-fold magnification, FIG. 3C showing a cross section with a 13000-fold magnification.
Figure 3B:
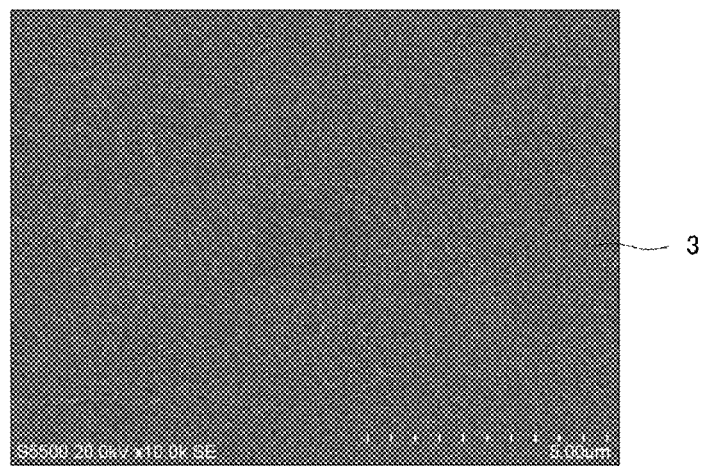
Figure 3C:
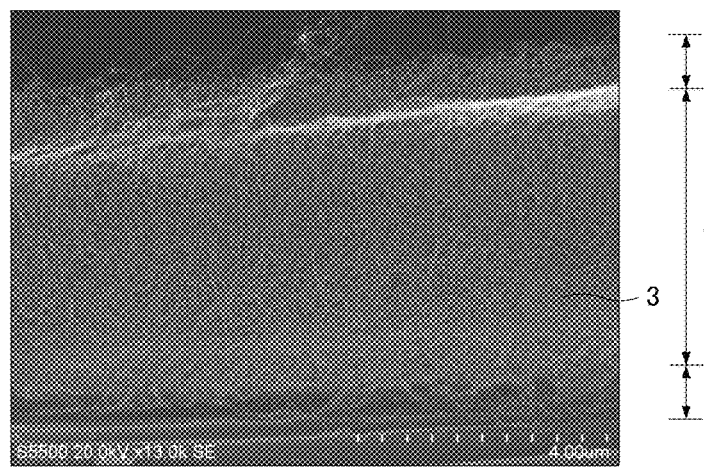

FIGS. 2 and 3 show enlarged SEM photographs of the carbon nanotube sheet 1 and the carbon nanotube layer 3 in an entangled state. Reference numeral 4f in FIG. 2 denotes fibers in the carbonized layer 4. FIGS. 2B and 2C are enlarged photographs showing the ranges of b and c of FIG. 2A. FIGS. 2A to 2C show that the fibers 4f of the carbonized layer 4 are bonded and entangled with the carbon nanotube layer 3. FIGS. 3A and 3B show the surface of the carbon nanotube layer 3 in an entangled state. FIG. 3C shows a cross section of the carbon nanotube layer 3 in an entangled state. In FIG. 3C, reference numeral 3t denotes the (inclined) distal end portions of the carbon nanotubes, reference numeral 3m denotes the (substantially longitudinally entangled) intermediate portions of the carbon nanotubes, and reference numeral 3r denotes the (inclined) proximal end portions of the carbon nanotubes. The carbon nanotube layer 3 in an entangled state in FIG. 3 is reduced in thickness to about 8 to 10 μm from about 180 μm by pressing.

The carbon nanotube sheet allows the fibrous carbonized layer 4 to retain the carbon nanotube layer 3. Thus, even if the carbon nanotube sheet 1 is so large as to be collected in a roll form, the carbon nanotube layer 3 can be obtained in a sheet form without being deformed.

The carbon nanotube layer 3 in an entangled state, in particular, can improve the wettability and thermal conductivity of the obtained carbon nanotube sheet 1 and more firmly keep the sheet form.

A production method for the carbon nanotube sheet 1 will be described below. In the following example, the carbon nanotube layer 3 is shaped like a brush.

As shown in FIG. 4, the production method schematically includes a combining step 73 of combining carbon nanotubes and a film sheet of thermosetting resin (e.g., phenol resin, epoxy resin, melanin resin, urea resin, or alkyd resin) into a composite sheet, and a carbonizing step 74 of carbonizing the film sheet of the composite sheet into the fibrous carbonized layer 4. The film sheet of thermosetting resin is an example of a thermally carbonized sheet. The thermally carbonized sheet may be any sheet thermally carbonized into a fibrous sheet. For example, a nonwoven wood-base sheet of cellulose may be used in addition to a film sheet of thermosetting resin. In the following description, the film sheet of thermosetting resin will be simply referred to as the film sheet. Furthermore, numerous carbon nanotubes gather into a brush form as in the configuration of the carbon nanotube layer 3 but the carbon nanotubes are discriminated from the carbon nanotube layer 3 before being retained by the carbonized layer 4.

In the combining step 73, the film sheet is heated and is pressed to the carbon nanotubes, forming the composite sheet containing the carbon nanotubes and the film sheet. In the carbonizing step 74, the composite sheet is heated in an atmosphere of nitrogen gas so as to carbonize the film sheet into the fibrous carbonized layer 4. Since the carbonized layer 4 and the carbon nanotube layer 3 are both made of carbon, the fibrous carbonized layer 4 is bonded and entangled with the proximal end portions of the carbon nanotubes of the carbon nanotube layer 3 so as to retain the carbon nanotube layer 3.

An example of a production unit used for the production method will be described below.

Figure 5:
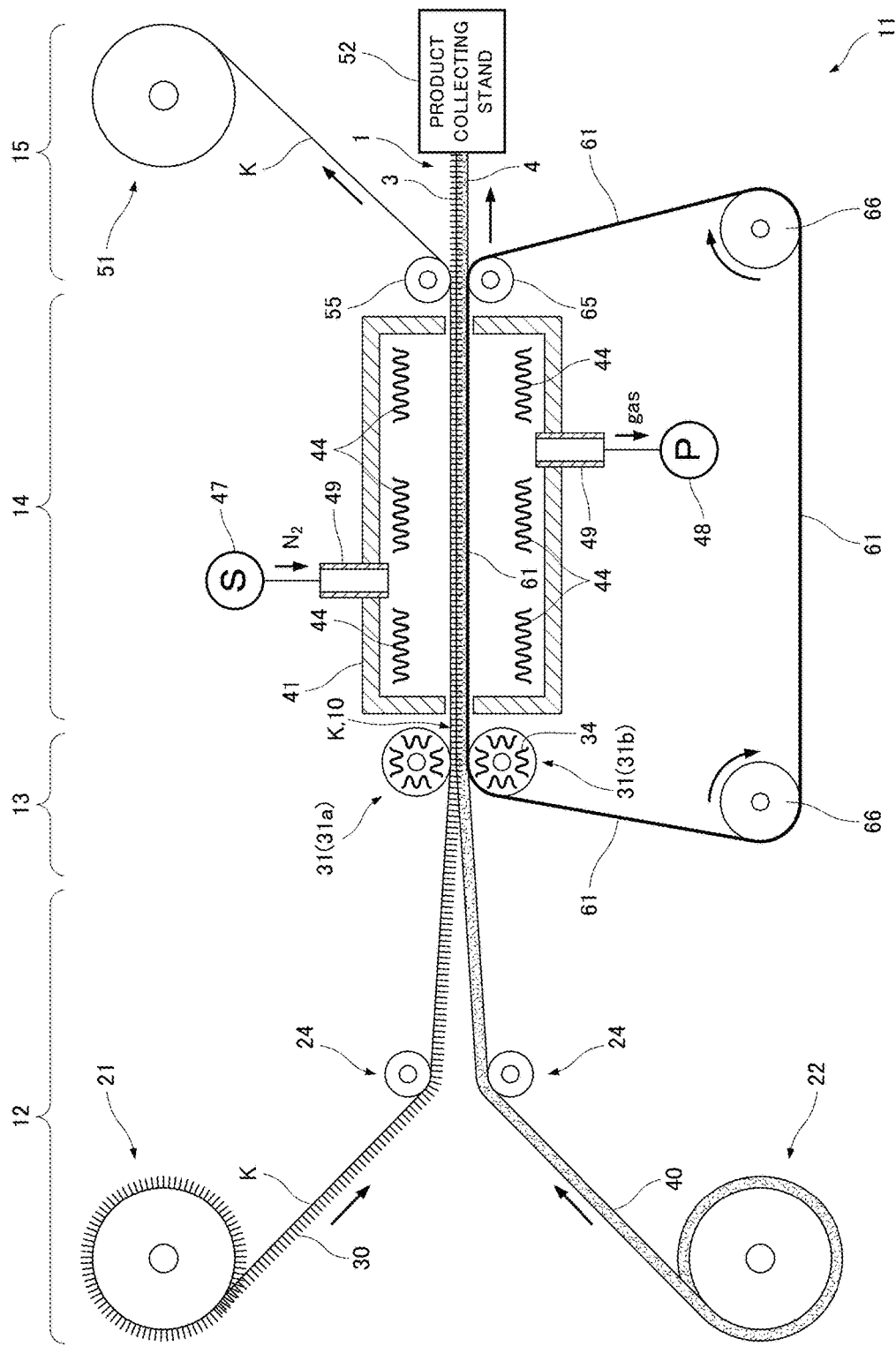
FIG. 5 is a schematic diagram showing a production unit used for the production method.

As shown in FIG. 5, a production unit 11 includes a delivery unit 12 that delivers a substrate (holding carbon nanotubes 30) K and a film sheet 40, a combining unit 13 that combines the delivered carbon nanotubes 30 and the film sheet 40 into a composite sheet 10, a carbonizing unit 14 that carbonizes the film sheet 40 of the composite sheet 10 to form the composite sheet 10 into the carbon nanotube sheet 1, and a collecting unit 15 that peels the substrate K from the carbon nanotube sheet 1 and collects the carbon nanotube sheet 1, the substrate K holding the carbon nanotube layer 3 of the carbon nanotube sheet 1. In this configuration, the combining unit 13 and the carbonizing unit 14 perform the combining step 73 and the carbonizing step 74, respectively, in the production method. Moreover, the carbon nanotubes 30 (the substrate K holding the carbon nanotubes 30) and the film sheet 40 are belt-shaped and are delivered in batches or continuously from the delivery unit 12 to the collecting unit 15 in the longitudinal direction. As a matter of course, the carbon nanotubes 30 are combined into the carbon nanotube layer 3 in the combining unit 13 and the film sheet 40 is carbonized into the fibrous carbonized layer 4 in the carbonizing unit 14. The production unit 11 has multiple rolls, which will be described later. The axes of these rolls are horizontally oriented in parallel.

The delivery unit 12 includes a first feed roll 21 and a second feed roll 22. The first feed roll 21 has a roll of the substrate (holding the carbon nanotubes 30) K and is configured to deliver the carbon nanotubes 30 with the substrate K in batches or continuously. The second feed roll 22 has a roll of the film sheet 40 and is configured to deliver the film sheet 40 in batches or continuously. The delivery unit 12 has upper and lower guide rolls 24 that deliver the substrate K, the carbon nanotubes 30 retained by the substrate K, and the film sheet 40 to the combining unit 13 from the delivery positions to a substantially horizontal position. The upper and lower guide rolls 24 are spaced such that the substrate (holding the carbon nanotubes 30) K and the film sheet 40 gradually approach each other and do not come into contact with each other before the combining unit 13. The rolled substrate (holding the carbon nanotubes 30) K on the first feed roll 21 is delivered such that the carbon nanotubes 30 face the film sheet 40, that is, the substrate K comes into contact with the guide roll 24.

The combining unit 13 has upper and lower press rolls 31 (31a, 31b) that press the substrate (holding the carbon nanotubes 30) K and the film sheet 40 to combine the carbon nanotubes 30 and the film sheet 40. The upper and lower press rolls 31 press the substrate (holding the carbon nanotubes 30) K and the film sheet 40 that are stacked and passed between the upper and lower press rolls 31. Particularly, the press roll 31 (31b) on the film sheet 40 includes a heater 34 for heating the film sheet 40 to be passed and pressed.

The carbonizing unit 14 includes a furnace 41 that can be brought into an atmosphere of inert gas and allows passage of the composite sheet 10 to be heated, a gas feeder 47 that supplies inert gas (e.g., nitrogen gas) into the furnace 41, and a pump 48 that discharges gas from the inside of the furnace 41. The gas feeder 47 and the pump 48 are each connected to the inside of the furnace 41 via a pipe 49 and a valve (not shown). The furnace 41 includes an electric furnace heater 44 that heats the inside of the furnace 41 to a predetermined temperature.

The film sheet 40 is heated and shrunk into the fibrous carbonized layer 4, which deforms the carbon nanotube sheet 1 to be produced. In order to prevent such deformation, a stiffener belt (an example of a stiffening member) 61 is extended in contact with the film sheet 40 (carbonized layer 4) in the furnace 41 so as to keep the flat shape of the film sheet 40. A tension is applied to the stiffener belt 61 to keep the flatness of the stiffener belt 61. The stiffener belt 61 to be resistant to the tension and heat is preferably made of metals. The production unit 11 includes a tension roll 65 having the looped stiffener belt 61 downstream of the furnace 41 and driving rolls 66 that drive the stiffener belt 61. In other words, the stiffener belt 61 is looped over the press roll 31 (31b), the tension roll 65, and the driving rolls 66 near the film sheet 40.

The collecting unit 15 includes a peeling roll 55 located on the substrate K so as to guide the substrate K in a direction in which the substrate K is peeled from the carbon nanotube sheet 1, a substrate collecting roll 51 that collects the substrate K peeled from the carbon nanotube sheet 1, and a product collecting stand 52 for collecting the carbon nanotube sheet 1 produced by peeling the substrate K.

The production method for the carbon nanotube sheet 1 using the production unit 11 will be specifically described below.

The carbon nanotube layer 3 is formed beforehand on the surface of the belt-shaped substrate K and then the carbon nanotubes 30 retained by the substrate K are rolled with the substrate K. Subsequently, the rolled substrate (holding the carbon nanotubes 30) K is set on the first feed roll 21 while the rolled film sheet 40 is additionally prepared on the second feed roll 22.

The substrate K is then delivered from the first feed roll 21. The delivered substrate K passes over one of the guide rolls 24, between the upper and lower press rolls 31, through the furnace 41, and over the peeling roll 55 and then is wound up by the substrate collecting roll 51. Similarly, the film sheet 40 is delivered from the second feed roll 22. The delivered film sheet 40 passes over the other guide roll 24, between the upper and lower press rolls 31, and through the furnace 41 and then is collected by the product collecting stand 52. The film sheet 40 is brought into contact with (restrained by) the stiffener belt 61 in the furnace 41.

Subsequently, the gas feeder 47 supplies nitrogen gas into the furnace 41 and discharges gas from the inside of the furnace 41 with the pump 48, bringing the inside of the furnace 41 into an atmosphere of nitrogen gas. Moreover, the electric furnace heater 44 heats the inside of the furnace 41 to a predetermined temperature (e.g., 400° C.). The predetermined temperature is 400 to 700° C., preferably about 600° C. The heat-up time ranges from 1 to 10° C. per minute, preferably from 2 to 5° C. per minute. Meanwhile, the heater 34 of the press roll 31 (31b) on the film sheet 40 heats the press roll 31b to another predetermined temperature (e.g., 130° C.).

After that, the substrate collecting roll 51 and the driving rolls 66 are rotated to deliver the substrate K and the film sheet 40 (the carbonized layer 4 from the carbonizing unit 14) in batches from the delivery unit 12 to the collecting unit 15. Thus, in the combining unit 13, the press roll 31 heats the film sheet 40 and presses the carbon nanotubes 30 (e.g., a pressure of 2 MPa). The pressure substantially ranging from 6 to 15 MPa may be 2 to 30 MPa. In the carbonizing unit 14, the composite sheet 10 is heated in the atmosphere of nitrogen gas in the furnace 41. This does not allow a reaction of the carbon nanotube layer 3 but carbonizes the film sheet 40 into the fibrous carbonized layer 4. With the batch delivery, the composite sheet 10 is stopped only for a predetermined time (e.g., two to three hours) and is heated to the predetermined temperature in the carbonizing unit 14. In this case, the film sheet 40 is heated and shrunk into the fibrous carbonized layer 4. The film sheet 40 in contact with (restrained by) the stiffener belt 61 does not bend the flat shape of the carbon nanotube sheet 1. Moreover, the shrinkage brings the carbon nanotubes close to one another in the carbon nanotube layer 3, increasing the density of the carbon nanotube layer 3. In the collecting unit 15, the substrate K is peeled from the carbon nanotube sheet 1 by the peeling roll 55 and then is collected by the substrate collecting roll 51, allowing the product collecting stand 52 to collect the carbon nanotube sheet 1 in batches.

The electrical resistance of the collected carbon nanotube sheet 1, a characteristic of the carbon nanotube, was 0.05Ω. Thus, the obtained carbon nanotube sheet 1 had lower conductivity (the characteristic of the carbon nanotube is improved) than a vertically aligned carbon nanotube sheet retained by an adhesive or the like. This is because the film sheet 40 carbonized into the fibrous carbonized layer 4 shrinks to about one quarter the original area so as to substantially quadruple the density of the carbon nanotube layer 3 retained by the fibrous carbonized layer 4.

According to the production method for the carbon nanotube sheet 1 of the first embodiment, even if the carbon nanotube sheet 1 is so large as to be collected in a roll form, the carbon nanotube layer 3 can be obtained in a sheet form without being deformed.

Moreover, the density of the carbon nanotube layer 3 of the carbon nanotube sheet 1 increases so as to improve the characteristic of the carbon nanotube.

The carbon nanotube sheet 1 is not bent and thus can have a versatile flat shape.

The carbon nanotube sheet 1 continuously produced in batches can improve production efficiency.

Second Embodiment

Figure 6:
FIG. 6 is an enlarged cross-sectional view of a carbon nanotube sheet according to a second embodiment of the present invention.

In the carbon nanotube sheet 1 according to the first embodiment, the carbon nanotube layer 3 is retained on the front side (that is, one surface) of the fibrous carbonized layer 4 (see FIG. 1). In a carbon nanotube sheet 1 according to a second embodiment, carbon nanotube layers 3 are retained on front and back sides (that is, both surfaces) of a fibrous carbonized layer 4 (see FIG. 6). A production method according to the second embodiment will be described below regarding different configurations from those of the first embodiment. The same configurations as those of the first embodiment are indicated by the same reference numerals and the explanation thereof is omitted.

In the production method according to the second embodiment, carbon nanotubes 30 retain the front and back sides of a film sheet 40 unlike in the combining step 73 of the production method according to the first embodiment, in which the film sheet 40 is pressed to the carbon nanotubes 30.

A production unit 11 used for the production method according to the second embodiment will be first described below.

Figure 7:
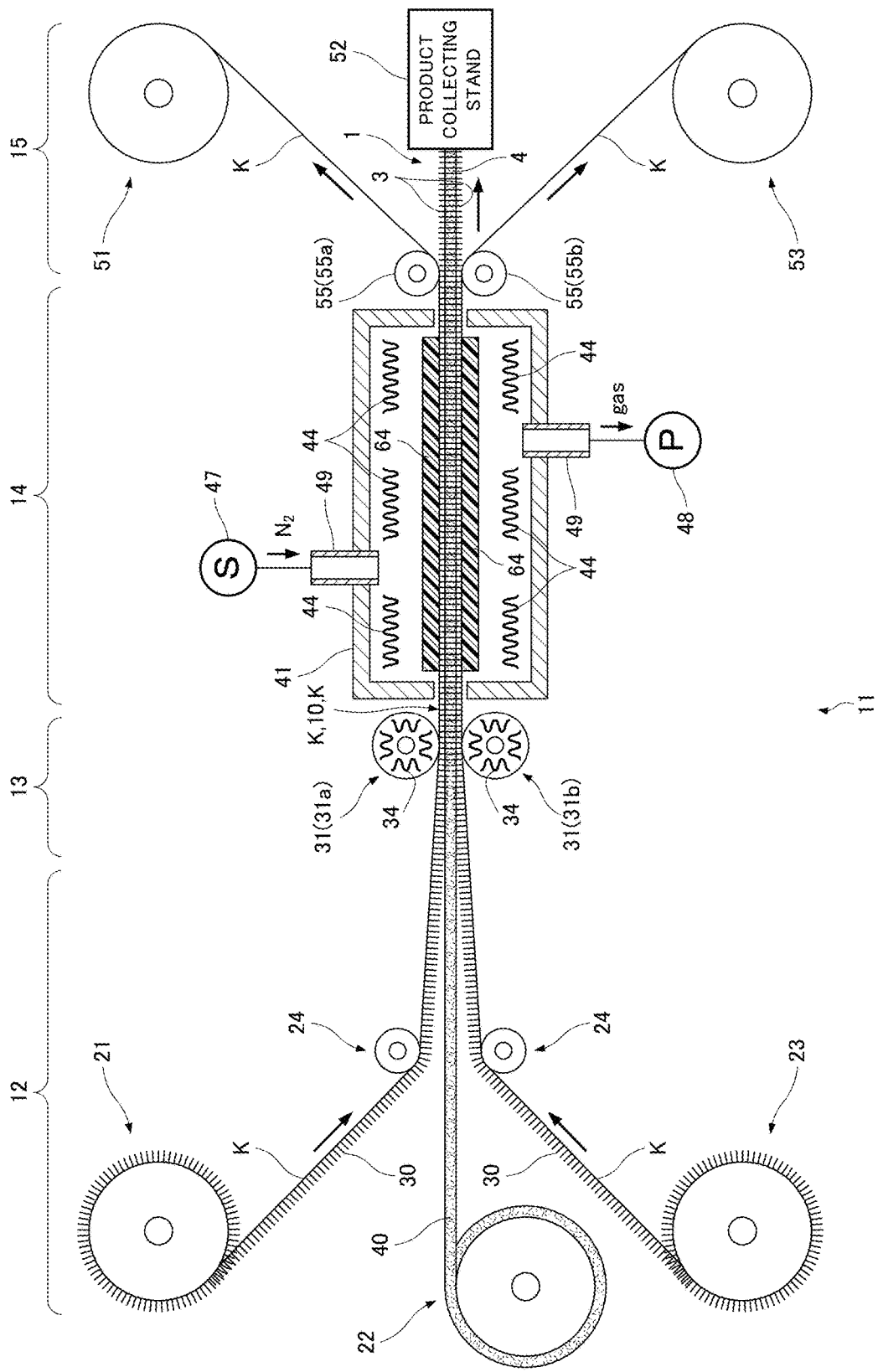
FIG. 7 is a schematic diagram showing a production unit used for a production method for the carbon nanotube sheet.

As shown in FIG. 7, a delivery unit 12 in the production unit 11 has a third feed roll 23 as well. Like a first feed roll 21, the third feed roll 23 has a roll of a substrate (retaining the carbon nanotubes 30) K and can continuously deliver the carbon nanotubes 30 with the substrate K. The third feed roll 23 is located with a second feed roll 22 disposed between the first feed roll 21 and the third feed roll 23. The delivery unit 12 includes upper and lower guide rolls 24 spaced such that the upper and lower substrates (each holding the carbon nanotubes 30) K and the film sheet 40 therebetween gradually approach each other and do not come into contact with each other before a combining unit 13.

The combining unit 13 in the production unit 11 includes upper and lower press rolls 31 that press the carbon nanotubes 30 from the front and back sides of the film sheet 40, combining the upper and lower carbon nanotubes 30 and the film sheet 40 therebetween. Moreover, the upper and lower press rolls 31 (31*a*, 31*b*) each include a heater 34, allowing the press rolls 31 to heat the film sheet 40 through the upper and lower substrates (holding the carbon nanotubes) K.

A furnace 41 of a carbonizing unit 14 in the production unit 11 contains stiffener plates (an example of a stiffening member) 64 instead of the stiffener belt 61. The stiffener plates 64 hold (restrain) a composite sheet 10 (carbon nanotube sheet 1) along with the upper and lower substrates K. This keeps the flat shape of the composite sheet 10 and prevents deformation.

A collecting unit 15 in the production unit 11 has two peeling rolls 55, specifically, upper and lower peeling rolls 55 (55*a*, 55*b*). The upper peeling roll 55*a* peels the substrate K located on the carbon nanotube sheet 1 while the lower peeling roll 55*b* peels the substrate K located under the carbon nanotube sheet 1. The collecting unit 15 further includes two substrate collecting rolls, specifically, upper and lower substrate collecting rolls 51 and 53. The one substrate collecting roll 51 collects one of the substrates K peeled from the carbon nanotube sheet 1 while the other substrate collecting roll 53 collects the other substrate K peeled from the carbon nanotube sheet 1. The upper and lower substrate collecting rolls 51 and 53 are disposed with a product collecting stand 52 located between the substrate collecting rolls 51 and 53.

The production method for the carbon nanotube sheet 1 using the production unit 11 will be specifically described below.

The rolled substrate (holding the carbon nanotubes 30) K is set beforehand on the third feed roll 23 as well as the first feed roll 21.

The substrate K is then delivered also from the third feed roll 23. The delivered substrate K passes over the other guide roll 24, over the other press roll 31*b*, through the furnace 41, and over the other peeling roll 55*b* and then is wound up by the other substrate collecting roll 53. Meanwhile, the film sheet 40 delivered from the second feed roll 22 passes between the upper and lower guide rolls 24, between the upper and lower press rolls 31, and through the furnace 41 so as to be located between the upper and lower carbon nanotubes 30, and then the film sheet 40 is collected by the product collecting stand 52. The upper and lower substrates K are held between the stiffener plates 64 in the furnace 41.

After that, the upper and lower substrate collecting rolls 51 and 53 are rotated to continuously deliver the upper and lower substrates K and the film sheet 40 (the carbonized layer 4 from the carbonizing unit 14) from the delivery unit 12 to the collecting unit 15. In the combining unit 13, the press rolls 31 press the film sheet 40 held between the upper and lower carbon nanotubes 30 from the front and back sides of the film sheet 40. At this point, the upper and lower carbon nanotubes 30 are heated along with the film sheet 40. In this case, the film sheet 40 is heated and shrunk into the fibrous carbonized layer 4 held (restrained) between the stiffener plates 64, keeping the flat shape of the fibrous carbonized layer 4 without bending the carbon nanotubes. The shrinkage brings the carbon nanotubes to close to one another in the carbon nanotube layer 3, increasing the density of the carbon nanotube layer 3.

The production method for the carbon nanotube sheet 1 according to the second embodiment can obtain the effect of the first embodiment and retain the continuously produced carbon nanotube layers 3 on the front and back sides (both surfaces) of the fibrous carbonized layer 4, thereby further increasing the production efficiency.

Third Embodiment

In a production method according to a third embodiment, two layers of vertically aligned carbon nanotubes are pressed together into a single layer that is used as the carbon nanotubes 30 in the combining step 73 of the first embodiment. The production method according to the third embodiment will be described below regarding different configurations from those of the first embodiment. The same configurations as those of the first embodiment are indicated by the same reference numerals and the explanation thereof is omitted.

A carbon nanotube layer 3 of a carbon nanotube sheet 1 produced by the production method includes a sparse layer 3*s* close to a carbonized layer 4 and a dense layer 3*d* separated from the carbonized layer 4 (see FIG. 8) or includes the dense layer 3*d* close to the carbonized layer 4 and the sparse layer 3*s* separated from the carbonized layer 4 (see FIG. 9).

A production unit 11 according to the third embodiment is different from that of the first embodiment only in the layer set on a first feed roll 21. Specifically, the two layers of vertically aligned carbon nanotubes are pressed together into a single layer and then a rolled substrate K holding the carbon nanotubes 30 is set on the first feed roll 21 of the third embodiment. In the two layers of the vertically aligned carbon nanotubes, the carbon nanotubes making up the respective layers vary in length and/or density. The lengths and/or densities of the carbon nanotubes are determined according to the percentage of voids and thickness of the carbon nanotube layer 3 to be obtained. Other configurations of the production unit 11 and the production method are identical to those of the first embodiment.

The production method for the carbon nanotube sheet 1 according to the third embodiment can obtain the effect of the first embodiment and adjust the percentage of voids and thickness of the carbon nanotube layer 3 to be obtained.

Fourth Embodiment

In a production method according to a fourth embodiment, two layers of vertically aligned carbon nanotubes are pressed together into a single layer that is used as the carbon nanotubes 30 in the combining step 73 of the second embodiment. The production method according to the fourth embodiment will be described below regarding different configurations from those of the second embodiment. The same configurations as those of the second embodiment are indicated by the same reference numerals and the explanation thereof is omitted.

A carbon nanotube layer 3 of a carbon nanotube sheet 1 produced by the production method includes a sparse layer 3s close to a carbonized layer 4 and a dense layer 3d separated from the carbonized layer 4 (see FIG. 10) or includes the dense layer 3d close to the carbonized layer 4 and the sparse layer 3s separated from the carbonized layer 4 (see FIG. 11).

A production unit 11 according to the fourth embodiment is different from that of the second embodiment only in the layers set on a first feed roll 21 and a third feed roll 23. Specifically, the two layers of vertically aligned carbon nanotubes 30 are pressed into a single layer and then a rolled substrate K holding the carbon nanotubes 30 is set on each of the first feed roll 21 and the third feed roll 23 of the fourth embodiment. The two layers of the vertically aligned carbon nanotubes include different carbon nanotubes in length and/or density. The lengths and/or densities are determined according to the percentage of voids and thickness of the carbon nanotube layer 3 to be obtained. Other configurations of the production unit 11 and the production method are identical to those of the second embodiment.

The production method for the carbon nanotube sheet 1 according to the fourth embodiment can obtain the effect of the second embodiment and adjust the percentage of voids and thickness of the carbon nanotube layer 3 to be obtained.

In the first to fourth embodiments, an example of inert gas is, but not exclusively, nitrogen gas. Gas containing rare-gas elements such as helium, neon, and argon may be used.

In the production methods and the production units according to the first to fourth embodiments, the carbonizing step is performed after the combining step. As a matter of course, the combining step and the carbonizing step may be performed at the same time.

Furthermore, in the first to fourth embodiments, an example of a thermally carbonized sheet is, but not exclusively, the film sheet 40 made of thermosetting resin or a nonwoven wood-base sheet. Any sheets that are carbonized into fibers by heating may be used.

In the production methods according to the first to fourth embodiments, the substrate K and the film sheet 40 (the carbonized layer 4 from the carbonizing unit 14) are delivered in batches. The substrate K and the film sheet 40 may be continuously delivered so as to further increase the production efficiency.

In the first to fourth embodiments, the carbon nanotubes of the carbon nanotube layer 3 (carbon nanotubes 30) are not specifically described. The carbon nanotubes may be single-walled nanotubes or multi-walled nanotubes (including double-walled nanotubes).

The first to fourth embodiments do not specifically describe a pressure of the film sheet 40 to the carbon nanotubes 30 in the combining step in the production methods. The pressure is optionally set as long as the distal and proximal end portions of the carbon nanotubes 30 are inclined and the intermediate portions of the carbon nanotubes 30 are entangled with one another (the carbon nanotubes 30 are pressed to have about up to a half of the thickness of the carbon nanotubes 30). This production method obtains the carbon nanotube sheet 1 shown in FIG. 1B, that is, the carbon nanotube sheet 1 including the carbon nanotube layer 3 in an entangled state. Thus, the production method can obtain the effects of the first to fourth embodiments, improve the wettability and thermal conductivity of the obtained carbon nanotube sheet 1, and more reliably keep the sheet form of the carbon nanotube sheet 1.

The invention claimed is:

1. A production method for a carbon nanotube sheet, comprising:
   a combining step of forming a composite sheet by thermally pressing a thermally carbonized sheet to carbon nanotubes; and
   a carbonizing step of carbonizing the thermally carbonized sheet in the composite sheet and forming the thermally carbonized sheet into a fibrous form being bonded and entangled with proximal end portions of the carbon nanotubes by heating the composite sheet in an atmosphere of inert gas.

2. The production method for the carbon nanotube sheet according to claim 1, wherein bending of the composite sheet in the carbonizing step is restricted by a stiffening member.

3. The production method for the carbon nanotube sheet according to claim 1, wherein the carbon nanotubes in the combining step are two layers of vertically aligned carbon nanotubes that are stacked by pressing the layers together.

4. The production method for the carbon nanotube sheet according to claim 3, wherein in the two layers of the vertically aligned carbon nanotubes, the carbon nanotubes making up the respective layers vary in length and/or density.

5. The production method for the carbon nanotube sheet according to claim 1, wherein the pressing of the thermally carbonized sheet to the carbon nanotubes in the combining step is to hold the thermally carbonized sheet with the vertically aligned carbon nanotubes from front and back sides of the sheet.

6. The production method for the carbon nanotube sheet according to claim 1, wherein the thermally carbonized sheet is delivered from a location for the combining step to a location for the carbonizing step and is delivered in batches or continuously.

7. The production method for the carbon nanotube sheet according to claim 2, wherein the carbon nanotubes in the combining step are two layers of vertically aligned carbon nanotubes that are stacked by pressing the layers together.

8. The production method for the carbon nanotube sheet according to claim 7, wherein in the two layers of the vertically aligned carbon nanotubes, the carbon nanotubes making up the respective layers vary in length and/or density.

9. The production method for the carbon nanotube sheet according to claim 2, wherein the pressing of the thermally carbonized sheet to the carbon nanotubes in the combining step is to hold the thermally carbonized sheet with the vertically aligned carbon nanotubes from front and back sides of the sheet.

10. The production method for the carbon nanotube sheet according to claim 2, wherein the thermally carbonized sheet is delivered from a location for the combining step to a location for the carbonizing step and is delivered in batches or continuously.

* * * * *